United States Patent
Tzabari et al.

(10) Patent No.: US 10,437,910 B2
(45) Date of Patent: Oct. 8, 2019

(54) TREND CORRELATIONS

(71) Applicant: ENTIT Software LLC, Sunnyvale, CA (US)

(72) Inventors: Liron Tzabari, Yehud (IL); Elad Benedict, Yehud (IL); Doron Levi, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 74 days.

(21) Appl. No.: 15/564,910

(22) PCT Filed: Apr. 29, 2015

(86) PCT No.: PCT/US2015/028148
§ 371 (c)(1),
(2) Date: Oct. 6, 2017

(87) PCT Pub. No.: WO2016/175776
PCT Pub. Date: Nov. 3, 2016

(65) Prior Publication Data
US 2018/0121390 A1 May 3, 2018

(51) Int. Cl.
G06F 17/18 (2006.01)
G06K 9/00 (2006.01)
G06K 9/62 (2006.01)

(52) U.S. Cl.
CPC ......... *G06F 17/18* (2013.01); *G06K 9/00536* (2013.01); *G06K 9/6203* (2013.01); *G06F 2216/03* (2013.01)

(58) Field of Classification Search
CPC ... G06F 17/18; G06K 9/00536; G06K 9/6203

USPC .......................................... 708/490, 422–426
See application file for complete search history.

(56) References Cited

U.S. PATENT DOCUMENTS

| 6,216,066 | B1 | 4/2001 | Goebel et al. |
| 6,484,132 | B1* | 11/2002 | Hively ............... G06K 9/00536 |
| | | | 600/544 |
| 7,818,224 | B2 | 10/2010 | Boerner |
| 8,110,364 | B2 | 2/2012 | Wohlgemuth et al. |
| 8,630,980 | B2 | 1/2014 | Piwonka et al. |
| 2005/0283337 | A1 | 12/2005 | Sayal |

(Continued)

OTHER PUBLICATIONS

Sayal, M., Detecting Time Correlations in Time-Series Data Streams, HP Technical Report: HPL-2004-103, 2004, 10 pages.

(Continued)

*Primary Examiner* — Tan V Mai

(57) ABSTRACT

Examples disclosed herein relate, among other things, to determining a trend correlation. In one aspect, a method is disclosed. The method may include, for example, receiving a first data set associated with a first parameter of an electronic device and a second data set associated with a second parameter of the electronic device. The method may also include generating a first trend set based on the first data set, and generating a second trend set based on the second data set. The method may further include detecting, based on the first trend set and the second trend set, a trend correlation between the first parameter of the electronic device and the second parameter of the electronic device, and providing for display correlation information describing the trend correlation.

20 Claims, 4 Drawing Sheets

(56) References Cited

U.S. PATENT DOCUMENTS

2006/0167825 A1    7/2006  Sayal
2007/0118545 A1*  5/2007  Chandrasekharan .. G06Q 10/10
2008/0250034 A1  10/2008  Petri
2014/0058572 A1    2/2014  Stein et al.
2014/0258198 A1    9/2014  Spivack et al.

OTHER PUBLICATIONS

International Searching Authority., International Search Report and Written Opinion dated Jan. 28, 2016 for PCT Application No. PCT/US2015/028148 Filed Apr. 29, 2015, 13 pgs.

Boker, S.M., et al,Window Cross-Corrlation and Peak Picking for the Analysis of Variability in the Association Between Behavioral Time Series. Psychological Methods. vol. 7. No. 3, Sep. 2002, pp. 1-30.

Unknown, Beadstudio Normalization Algorithms for Gene Expression Data, Data Sheet: RNA Analysis, Aug. 25, 2007, 6 pages. http://www.illumina.com/documents/products/technotes/technote_headstudio_normalization.

* cited by examiner

TREND CORRELATIONS

BACKGROUND

Various data processing applications today are required to process and analyze vast amounts of data. Such applications include, for example, signal and image processing applications, data mining applications, performance analysis applications, and the like.

BRIEF DESCRIPTION OF THE DRAWINGS

The following detailed description references the drawings, wherein.

DETAILED DESCRIPTION

Figure 1:
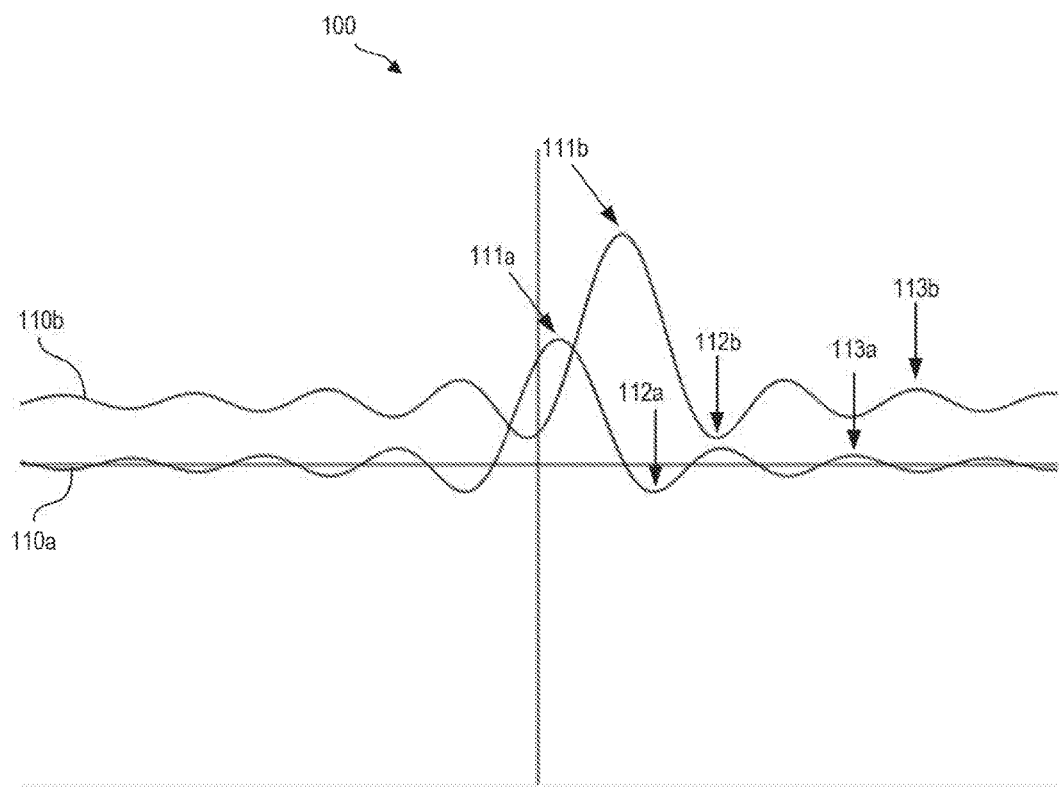
FIG. 1 shows an example graph with two example data sets.

As computational power of computing systems is rapidly increasing, data processing applications are given the task of analyzing increasingly large amounts of data. In some examples, the analyzed data may include "real-time" data, e.g., data describing real-time events or data describing real-time parameters (e.g., performance, utilization, power consumption, temperature, etc.) of systems and devices such as processors, memories, network devices, or other types of electronic or non-electronic systems or devices. It is appreciated, however, that the methods and systems described herein are not limited to real-time data and may be applicable to any type of discrete or continuous data.

In some examples, an application may be requested (e.g., by a user) to analyze two sets of data and to determine dependencies between the sets of data. Because each set of data may represent, for example, a different parameter of an electronic (or non-electronic) system, dependencies between the sets of data may indicate dependencies between the represented system parameters, which in turn may be used to better understand the system, identify problems with the system, fix or optimize the system, and so forth.

In some examples, an application may determine whether the different data sets and the parameters represented thereby are correlated, as well as the type and degree of the correlation. Alternatively or in addition, an application may determine whether the different data sets and the system parameters represented thereby are trend-correlated and the degree of that correlation. That is, the application may determine whether trends or changes in one parameter cause or are otherwise correlated to changes in the other parameter, and how similar those trends and changes are in terms of their direction, rate, magnitude, etc. The application may then provide information about the determined trend correlations (or lack thereof) to a user (e.g., an application engineer) who may use this information to analyze, fix, and optimize the system. For example, an app developer may use the application to obtain various performance data about a mobile app communicating with a server, and the application may indicate to the user whether an increase of a number of users simultaneously using the server also increases the response time of the application. If the application reports a strong positive correlation between the trends in the two parameters, the developer may decide to review and optimize the app's server-side handling of simultaneous users.

In some examples, the data sets may be obtained by the application from a volatile or non-volatile memory (e.g., database), from a local device or from a remote device (e.g., via one or more networks), or from any other source. The data sets may be obtained from the same source or from different sources. The data sets may have a finite size, or may be continuously received from their respective source(s) as streams of data.

In some examples, the determination of whether or not the data sets are trend-correlated may be complicated by the fact that each data set may be differently scaled, differently formatted, correspond to different measurement units, have a different offset, or have other types of discrepancies. Alternatively or in addition, in some examples, the data sets may not be temporally aligned. For example, two data sets may represent two parameters whose trends are dependent but are not directly aligned in terms of their position within the respective data sets. Such a positional offset may be caused by the manner in which the data sets are sampled and/or received by the application. For example, the data sets may reflect real-time data obtained from different network devices, in which case the offset may be caused by a difference in network latencies. Alternatively or in addition, the offset may reflect a true delay between the events or activities described by the data sets. For example, if one data set corresponds to a number of server uploads and the other data set corresponds to the server's hard drive utilization, the data in the two sets may be correlated but may be represented in the data sets at a certain offset, because it may take the server some time (e.g., 2 seconds) to process an upload request, to receive the uploaded data, and to start storing the uploaded data to the hard drive.

To illustrate, FIG. 1 shows an example graph 100 on which example data sets 110*a* and 110*b* are represented. In this example, data set 110*a* may describe real-time events 111*a*, 112*a*, and 113*a* that are correlated with events 111*b*, 112*b*, and 113*b* described by data set 110*b*, respectively. However, as illustrated in FIG. 1, data sets 110*a* and 110*b* may be scaled with different scaling factors and/or represent different units of measurement, and there may be an offset (e.g., a time delay) between the two data sets, as discussed above.

Some examples disclosed herein describe a computing device. The computing device may include, among other things, a trend detection engine to generate a first trend set based on a first data set, and generate a second trend set based on a second trend set. The computing device may also include an alignment engine to determine a lag amount between the first trend set and the second trend set, and shift the second trend set by the lag amount to produce a shifted second trend set. The computing device may further include a correlation calculation engine to determine a trend correlation between the first data set and the second set by calculating a degree of correlation between the first trend set, and the shifted second trend set. The computing device may also include an output interface to output the trend correlation.

Figure 2:
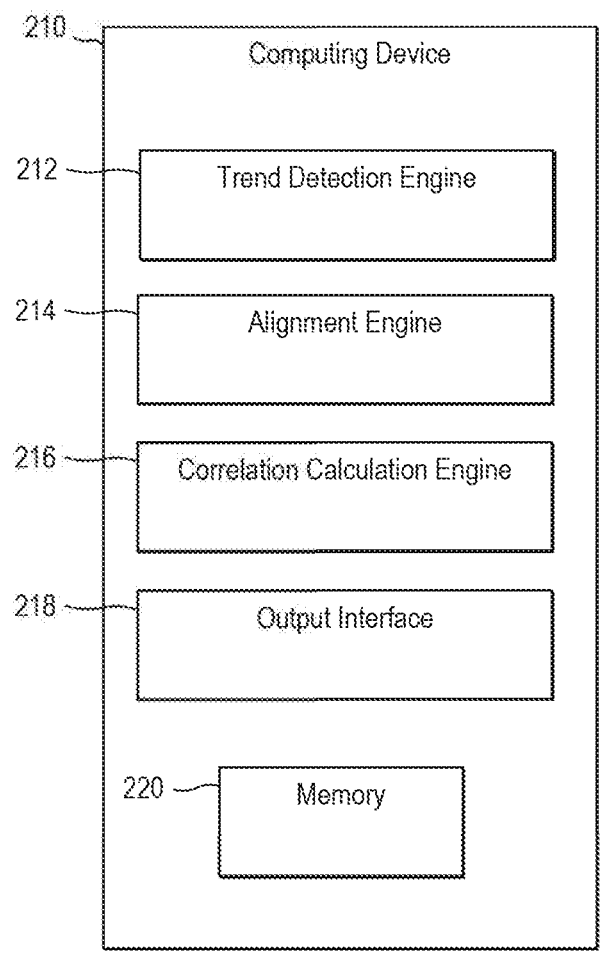
FIG. 2 is a block diagram of an example computing device

FIG. 2 is a block diagram of an example computing device 210. Computing device 210 may include any electronic device or a combination of electronic devices. The term "electronic devices" as used herein may include, among, other things, servers, desktop computers, laptop computers, tablet computers, smartphones, or any other electronic devices capable of performing the techniques described herein. In some examples, computing device 210 may also be referred to as a monitoring system.

As illustrated in the example of FIG. 2, computing device 210 may include, among other things, a trend detection engine 212, an alignment engine 214, a correlation calculation engine 216, an output interface 218, and a memory 220. Memory 220 may include any type of non-transitory memory, and may include any combination of volatile and non-volatile memory. For example, memory 220 may include any combination of random-access memories (RAMs), flash memories, hard drives, memristor-based memories, and the like. Memory 220 may be located on computing device 210 or on one or more other devices communicatively coupled to computing device 210. Engines 212, 214, 216, and 218 may each generally represent any combination of hardware and programming, as will be discussed in more detail below.

In some examples, trend detection engine 212 may obtain a first data set and a second data set. As discussed above, each set may include any type of digital data representing parameters (or events, activities, etc.) of one or more systems, which may include electronic and non-electronic systems. For example, the first data set may represent, among other things, a first parameter of an electronic device and the second data set may represent a second parameter of the same electronic device. In some examples, each data set may describe how its respective parameter changes over time or how it changes as a function of another variable. As discussed above, the parameters may include a number of users accessing a system (e.g., an electronic device) over time, the system's power consumption over time, the system's response time over time, or any other system parameter or characteristic.

In some examples, engine 212 may obtain one or both data sets from a memory (e.g., 220) located on computing device 210, or from a remote device communicatively coupled to computing device 210 through one or more networks, such as wired and/or wireless networks, local-area networks (LANs) and/or wide-area networks (WANs) such as the Internet, etc. As discussed above, in some examples, the data sets may describe various parameters, characteristics, or events associated with the remote device from which the data sets are obtained.

In some examples, after obtaining the two data sets, engine 212 may optionally pre-process at least one of the data sets. Pre-processing a data set may include, for example, scaling and/or adding an offset to the data set (e.g., to convert its units), formatting the data set, or otherwise manipulating the data set to better align it with the other data set.

In some examples, after obtaining the two data sets, engine 212 may produce or generate a first trend set based on the first data set and a second trend set based on the second data set, where each trend set represents the trends or changes of its respective data set. For example, engine 212 may differentiate (i.e., obtain a derivative of) the first data set to produce the first trend set, and differentiate the second data set to produce the second trend set. For example, if a data set includes discrete data that is a function of time, engine 212 may differentiate the data set using the following discrete differentiation formula:

$$D'(i) = \frac{D(i) - D(i-1)}{t_i - t_{i-1}}$$

where D represents the data set, D' represents the trend set, and D(i) and $t_i$ represent the value and time associated with the i-th sample of the data set, respectively.

After producing the first and second trend sets, trend detection engine 212 may pass the two trend sets to alignment engine 214. Alignment engine 214 may then process the two trend sets to determine a lag amount (e.g., a time delay) between them using any suitable cross-correlation technique. For example, engine 214 may shift one of the trend sets (e.g., the second trend set) by various shift amounts and determine which shift amount maximizes a dot product of the (shifted) trend set (e.g., the shifted second trend set). In other words, engine 214 may calculate the following dot product of the two sets for different shift amounts:

$$\sum_{i=1}^{n} D'_1(i) D'_2(i + \tau)$$

where $D'_1$ and $D'_2$ represent the first and second trend set, respectively, and $\tau$ represents the shift amount. Engine 214 may then determine the lag amount to be the shift amount that results in the highest dot product. It is appreciated that depending on the data of the first and second trend sets, the determined lag amount may be a negative amount, a positive amount, or zero.

In some examples, after determining the lag amount, if the lag amount is not zero, engine 214 may shift one of the two trend sets (e.g., the second trend set) by the lag amount to produce a shifted trend set. Engine 214 may then pass the two trend sets (one of which potentially being shifted) to correlation calculation engine 216. It is appreciated that in other examples, engine 214 may not actually shift the trend set, but may pass the information regarding the determined lag amount to engine 216, which may then use the lag amount in some of its calculations, as discussed above. Further, in some examples, the lag amount calculation and shifting, instead of being performed by engine 214 on the trend sets, may be performed on the original first and second data sets, e.g., either by trend detection engine 212 or by another engine from which engine 212 obtains the first and second data sets.

Correlation calculation engine 216 may receive the two trend sets, one of which has potentially been shifted, and determine, based on the two trend sets, a trend correlation between the original data sets. That is, engine 216 may determine whether and which correlation exists between trends in the first data set and trends in the second data set. For example, engine 216 may determine whether the trends of the two original data sets are correlated, whether the correlation is positive or negative, and the degree of the positive or negative correlation.

In some examples, to determine the trend correlation between the first and second data sets, engine 216 may calculate a degree of correlation between the first trend set and the second trend set, where one of the sets (e.g., the second trend set) may have been shifted by a lag amount by engine 214, as discussed above. In some examples, engine 216 may calculate the Pearson product-moment correlation coefficient between the first trend set and the second trend set, for example, using the following formula:

$$\rho(D'_1, D'_2) = \frac{\sum_i (D'_1(i) - \mu_1)(D'_2(i) - \mu_2)}{\sqrt{\sum_i (D'_1(i) - \mu_1)^2 \sum_i (D'_2(i) - \mu_2)^2}}$$

where $D'_1$ and $D'_2$ represent the optionally shifted first trend set and the optionally shifted second trend set, respectively, and where $\mu_1$ and $\mu_2$ represent the sample means of the first trend set and the second trend set, respectively. The calculated Pearson product-moment correlation coefficient $\rho$ may obtain values between $-1$ and $+1$, where $\rho=0$ represents lack of correlation, $0<\rho\leq1$ represents positive correlation ($\rho=1$ representing the perfect positive correlation), and $-1\leq\rho<0$ represents negative correlation ($\rho=-1$ representing the perfect negative correlation).

As discussed above, in some examples, one or both trend sets may be shifted by alignment engine 214. In other examples, alignment engine 214 may not actually shift the set(s). Instead, engine 214 may pass the lag amount information to engine 216, and engine 216 may incorporate the lag amount into the trend correlation calculation, e.g., by adjusting the sample indices of one of the trend sets to accommodate for the lag amount.

In some examples, before calculating the Pearson product-moment correlation coefficient, engine 216 may adjust the first trend set and the second trend set by subtracting means, $\mu_1$ and $\mu_2$ from each set, respectively, causing the sample mean of each set to be zero. If $\mu_1$ and $\mu_2$ are set to zero, the Pearson product-moment correlation coefficient may be calculated using the following reduced formula:

$$\rho(D'_1, D'_2) = \frac{\sum_i D'_1(i) D'_2(i)}{\sqrt{\sum_i D'_1(i)^2 \sum_i D'_2(i)^2}}$$

In other examples, engine 216 may use other suitable methods to measure linear or non-linear correlation between the two trend sets, such as the Brownian covariance method, the randomized dependence coefficient, the Spearman's rank correlation coefficient, and the like.

After determining the trend correlation (e.g., by determining the Pearson product-moment correlation coefficient) correlation calculation engine 216 may pass the trend correlation information to output interface 218. Output interface 218 may output the trend correlation, for example, by providing the trend correlation or information related to the trend correlation for display on a display of computing device 210 or of another device, by storing it in a volatile and/or non-volatile memory of computing device 210 (e.g., memory 220) or of another device, by sending (e.g., transmitting) it to another device, e.g., through one or more networks, or by any combination of these or other methods. As discussed above, the user may use the outputted trend correlation to learn, among other things, how one activity (e.g., represented by the first data set) affects the other activity (e.g., represented by the second data set), or vice versa. In some examples, output interface 218, upon obtaining the trend correlation may issue one or more signals or commands causing an adjustment in a system, such as a system whose parameters are represented by the first and/or second data sets. That is, in some examples, output interface 218 may adjust a system or its parameters based on a trend correlation detected between two or more parameters associated with that system.

In the foregoing discussion, engines 212, 214, 216, and 218 were described as any combinations of hardware and programming. Such components may be implemented in a number of fashions. The programming may be processor executable instructions stored, on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like. In another example, engines 212, 214, 216, and 218 may be implemented by hardware logic in the form of electronic circuitry, such as application specific integrated circuits.

Figure 3:
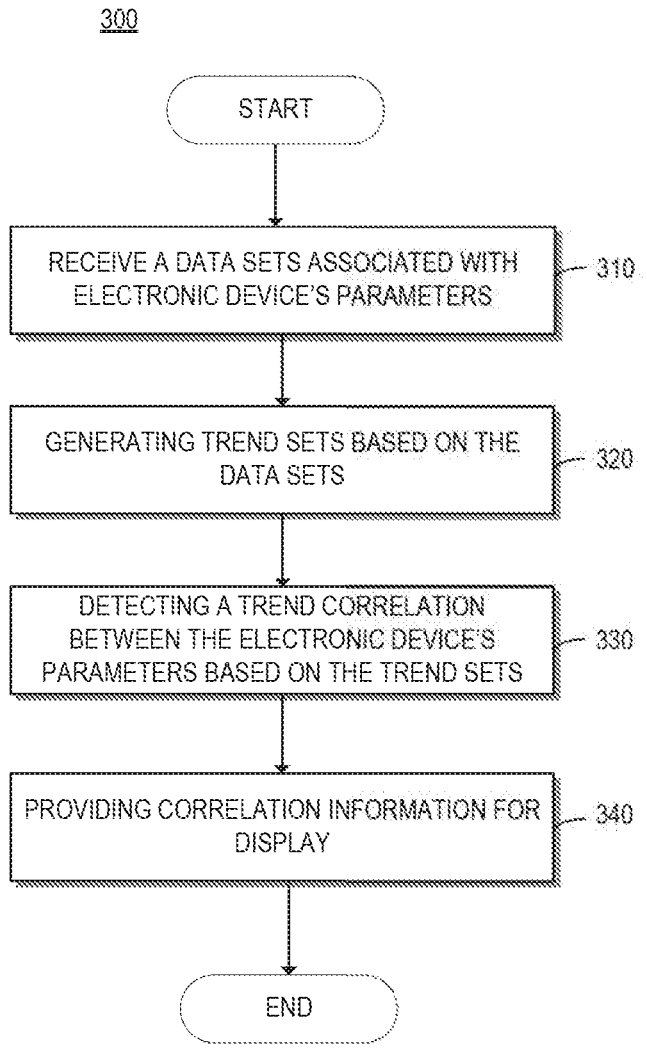
FIG. 3 shows a flowchart of an example method.

FIG. 3 is a flowchart of an example method 300 for detecting a trend correlation. Method 300 may be described below as being executed or performed by a system or by a performance monitoring device such as computing device 210 of FIG. 2. Other suitable systems and/or computing devices may be used as well. Method 300 may be implemented in the form of executable instructions stored on at least one non-transitory machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

At block 310, the method may receive, by a performance monitoring device (e.g. 210), a first data set associated with a first parameter of an electronic device, and, a second data set associated with a second parameter of the electronic device. At block 320, the method may generate, by the performance monitoring device, the a first trend set based on the first data set and a second trend set based on the second data set. As discussed above, the method may generate the trend sets, for example, by differentiating the data sets. At block 330, the method may, based on the first trend set and the second trend set, detect, by the performance monitoring device, a trend correlation between the first parameter of the electronic device and the second parameter of the electronic device. At block 340, the method may provide correlation information describing the trend correlation for display, e.g., on a display integrated into or communicatively coupled to the performance monitoring device.

As discussed above, in some examples (not shown in FIG. 3 for brevity) the method may also include determining a time delay between the first trend set and the second trend set, and shifting at least one of the first trend set and the second trend set by the time delay before detecting the trend correlation. As discussed above, determining the time delay may include shifting the second trend set by a plurality of shift amounts and determining which of the plurality of shift amounts maximizes a dot product of the first trend set and the second trend set. In some examples, as discussed above, the method may shift the at least one of the first data set and the second data set by the time delay before differentiating the first data set and the second data set.

Figure 4:
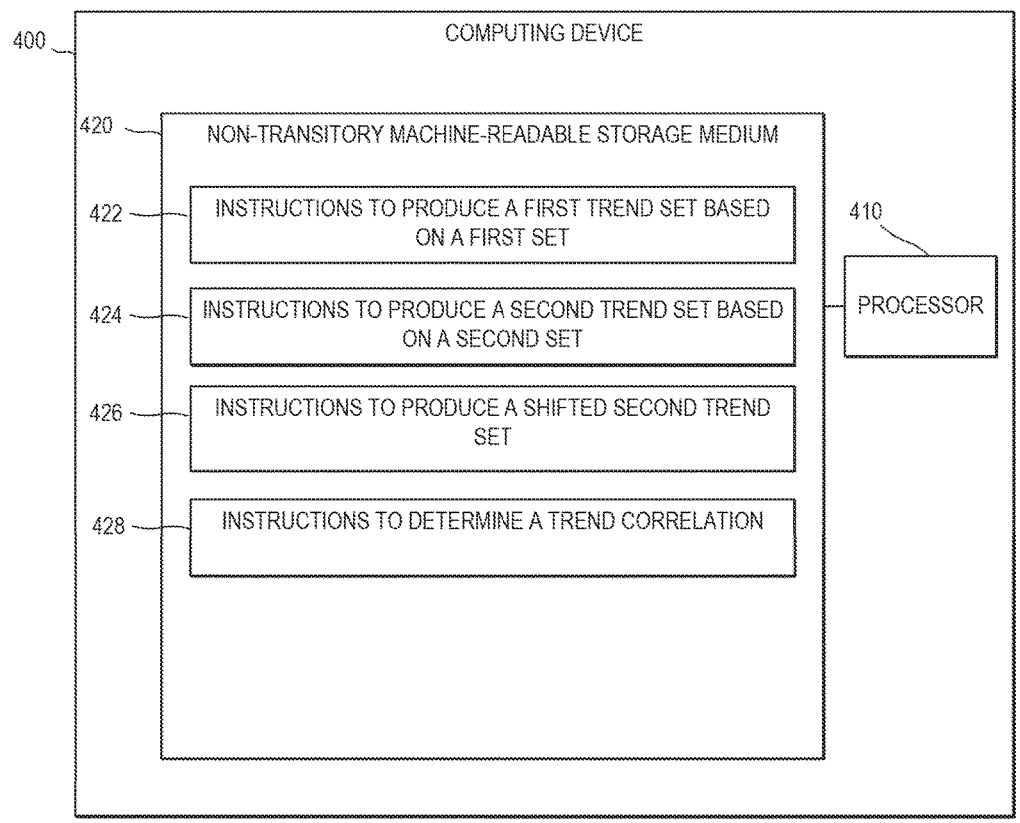
FIG. 4 is a block diagram of, an example computing device.

FIG. 4 is a block diagram of an example computing device 400. Computing device 400 may be similar to computing device 210 of FIG. 2. In the example of FIG. 4, computing device 400 includes a processor 410 and a non-transitory machine-readable storage medium 420. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 410 may be one or more central processing units (CPUs), microprocessors, and/or other hardware devices suitable for retrieval and execution of instructions stored in non-transitory machine-readable storage medium 420. In the particular example shown in FIG. 4, processor 410 may fetch, decode, and execute instructions 422, 424, 426, 428, or any other instructions not shown for brevity. As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 420 may be any electronic, magnetic, optical, or other physical storage device that stores executable instructions. Thus, medium 420 may be, for example, Random Access Memory (RAM), an Electrically-Erasable Programmable Read-Only Memory (EEPROM), a storage drive, an optical disc, and the like. Medium 420 may be disposed within computing device 400, as shown in FIG. 4. In this situation, the executable instructions may be "installed" on computing device 400. Alternatively, medium 420 may be a portable, external or remote storage medium, for example, that allows computing device 400 to download the instructions from the portable/external/remote storage medium. In this situation, the executable instructions may be part of an "installation package", As described herein, medium 420 may be encoded with executable instructions for finding a network device on a network.

Referring to FIG. 4, instructions 422, when executed by a processor, may cause a computing device to produce a first trend set by differentiating a first data set. Instructions 424, when executed by a processor, may cause a computing device to produce a second trend set by differentiating a second data set. Instructions 426, when executed by a processor, may cause a computing device to produce a shifted second trend set by shifting the second trend set by a delay detected between the first trend set and the second trend set. Instructions 428, when executed by a processor, may cause a computing device to determine a trend correlation between the first data set and the second data set by determining a linear correlation between the first trend set and the shifted second trend set. As discussed above, in some examples, determining the trend correlation may include calculating a Pearson product-moment correlation coefficient between the first trend set and the shifted second trend set.

Other instructions, not shown in FIG. 4 for brevity, may include instructions that, when executed by a processor, may cause a computing device to detect the delay by shifting the second trend set by a plurality of shift amounts and determining which of the plurality of shift amounts maximizes a dot product of the first trend set and the second trend set.

The disclosed examples may include systems, devices, computer-readable storage media, and methods for determining a trend correlation. For purposes of explanation, certain examples are described with reference to the components illustrated in FIGS. 2 and 4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIG. 3 is an example and is not intended to be limiting. Additional or fewer operations or combinations of operations may be used or may vary without departing from the scope of the disclosed examples. Thus, the present disclosure merely sets forth possible examples of implementations, and many variations and modifications may be, made to the described examples. All such modifications and variations are intended to be included within the scope of this disclosure and protected by the following claims.

The invention claimed is:
1. A computing device comprising:
   a trend detection engine to:
      generate a first trend set based on a first data set, wherein the first trend set comprises a first plurality of trend values, wherein each trend value in the first trend set is generated based on a discrete difference between two data values in the first data set, and
      generate a second trend set based on a second data set, wherein the second trend set comprises a second plurality of trend values, wherein each trend value in the second trend set is generated based on a discrete difference between two data values in the second data set;
   an alignment engine to:
      determine a lag amount between the first trend set and the second trend set, and
      shift the second trend set by the lag amount to produce a shifted second trend set;
   a correlation calculation engine to:

determine a trend correlation between the first data set and the second set by calculating a degree of correlation between the first trend set and the shifted second trend set; and an output interface to output the trend correlation.

2. The computing device of claim 1, wherein the degree of correlation represents a degree of linear correlation between the first trend set and the shifted second trend set.

3. The computing device of claim 1, wherein the correlation calculation engine is to calculate the degree of correlation by calculating a Pearson product-moment correlation coefficient between the first trend set and the shifted second trend set.

4. The computing device of claim 3, wherein calculating the Pearson product-moment correlation coefficient comprises normalizing the first trend set and the shifted second trend set to cause the first trend set and the shifted second trend set to have zero means.

5. The computing device of claim 1, wherein determining the lag amount comprises shifting the second trend set by a plurality of shift amounts and determining which of the plurality of shift amounts maximizes a dot product of the first trend set and the second trend set.

6. The computing device of claim 1, wherein the output interface is to output the trend correlation by at least one of: providing the trend correlation for display, storing the trend correlation, and transmitting the trend correlation to another device.

7. The computing device of claim 1, wherein the trend detection engine is further to pre-process at least one of the first data set and the second data set, wherein the pre-processing comprises at least one of formatting and scaling the at least one of the first data set and the second data set.

8. A method comprising:
receiving, by a performance monitoring device, a first data set associated with a first parameter of an electronic device and a second data set associated with a second parameter of the electronic device;
generating, by the performance monitoring device, a first trend set based on the first data set, wherein the first trend set comprises a first plurality of trend values, wherein each trend value in the first trend set is generated based on a discrete difference between two data values in the first data set;
generating a second trend set based on the second data set, wherein the second trend set comprises a second plurality of trend values, wherein each trend value in the second trend set is generated based on a discrete difference between two data values in the second data set;
based on the first trend set and the second trend set, detecting, by the performance monitoring device, a trend correlation between the first parameter of the electronic device and the second parameter of the electronic device; and
providing for display correlation information describing the trend correlation.

9. The method of claim 8, wherein the method further comprises:
determining a time delay between the first trend set and the second trend set; and
shifting at least one of the first trend set and the second trend set by the time delay before detecting the trend correlation.

10. The method of claim 9, wherein determining the time delay comprises shifting the second trend set by a plurality of shift amounts and determining which of the plurality of shift amounts maximizes a dot product of the first trend set and the second trend set.

11. The method of claim 10, wherein detecting the trend correlation comprises calculating a Pearson product-moment correlation coefficient between the first trend set and the shifted second trend set.

12. The method of claim 11, wherein calculating the Pearson product-moment correlation coefficient comprises normalizing the first trend set and the shifted second trend set to cause the first trend set and the shifted second trend set to have zero means.

13. The method of claim 11, comprising:
pre-processing at least one of the first data set and the second data set, wherein the pre-processing comprises at least one of formatting and scaling the at least one of the first data set and the second data set.

14. The method of claim 8, wherein the method further comprises:
determining a time delay between the first data set and the second data set; and
shifting at least one of the first data set and the second data set by the time delay before generating the first trend set and the second trend set.

15. The method of claim 8, wherein generating the first trend set comprises differentiating the first data set, and wherein generating the second trend set comprises differentiating the second data set.

16. A non-transitory machine-readable storage medium encoded with instructions executable by a processor of a computing device to cause the computing device to:
produce a first trend set by differentiating a first data set, wherein the first trend set comprises a first plurality of trend values, wherein each trend value in the first trend set is generated based on a discrete difference between two data values in the first data set;
produce a second trend set by differentiating a second data set, wherein the second trend set comprises a second plurality of trend values, wherein each trend value in the second trend set is generated based on a discrete difference between two data values in the second data set;
produce a shifted second trend set by shifting the second trend set by a delay detected between the first trend set and the second trend set; and
determine a trend correlation between the first data set and the second data set by determining a linear correlation between the first trend set and the shifted second trend set.

17. The non-transitory machine-readable storage medium of claim 16, wherein the instructions are further to cause the computing device to:
detect the delay by shifting the second trend set by a plurality of shift amounts, and determining which of the plurality of shift amounts maximizes a dot product of the first trend set and the second trend set.

18. The non-transitory machine-readable storage medium of claim 16, wherein determining the trend correlation comprises calculating a Pearson product-moment correlation coefficient between the first trend set and the shifted second trend set.

19. The non-transitory machine-readable storage medium of claim 18, wherein calculating the Pearson product-moment correlation coefficient comprises normalizing the first trend set and the shifted second trend set to cause the first trend set and the shifted second trend set to have zero means.

20. The non-transitory machine-readable storage medium of claim 16, wherein the instructions are further to cause the computing device to:
pre-process at least one of the first data set and the second data set, wherein the pre-processing comprises at least one of formatting and scaling the at least one of the first data set and the second data set.

* * * * *